Dec. 16, 1930.    J. H. ROBERTSON    1,785,285
CENTRIFUGAL GOVERNOR
Filed July 7, 1928
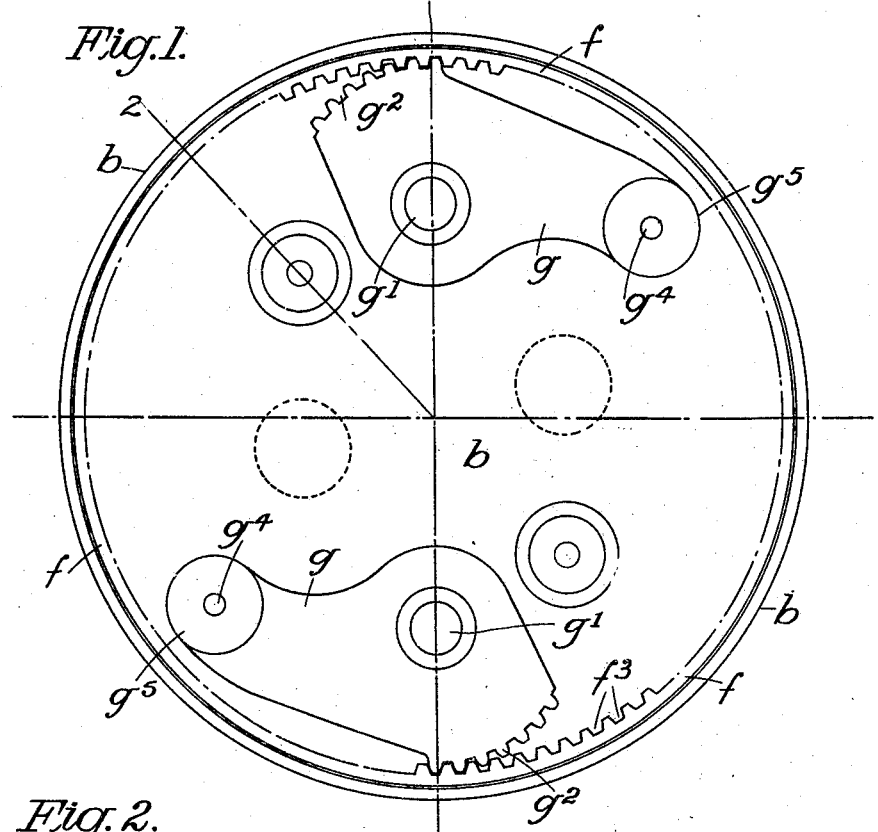
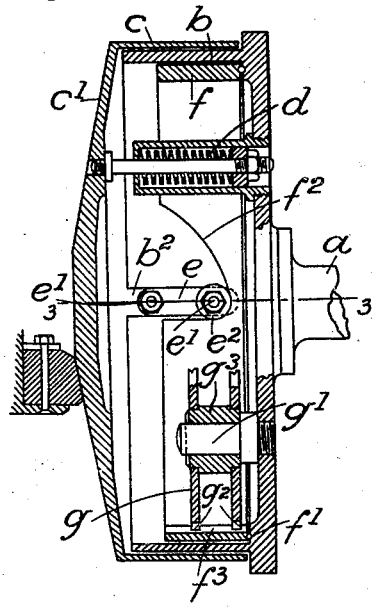
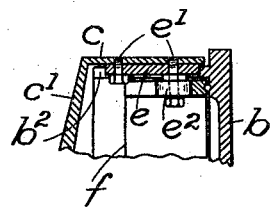
Inventor
John Hogg Robertson
By
Pennie, Davis, Marvin & Edmonds
Attorneys Patented Dec. 16, 1930

1,785,285

UNITED STATES PATENT OFFICE

JOHN HOGG ROBERTSON, OF LONDON, ENGLAND

CENTRIFUGAL GOVERNOR

Application filed July 7, 1928, Serial No. 291,121, and in Great Britain April 10, 1928.

This invention relates to centrifugal governors. The invention has for its object to provide an improved governor mechanism adapted to control the relative position or angular relation of two or more rotary parts, more especially in connection with variable friction gear of the kind in which one member is displaced axially in accordance with its speed of rotation.

According to this invention, the mechanism comprises a disc, casing or other support driven by the governor shaft or the like, in or upon which support there is mounted a ring or other part capable of rotation in relation to the said support. The ring is provided with internal teeth forming a part-circular rack, meshing with the corresponding toothed sectors of levers pivoted upon the supporting disc, each of said levers being formed or provided with a weighted arm lying to one side of the pivot.

The ring has one edge notched to form cam surfaces engaging internal projections from a slidable cover which in the preferred application of the invention affords one member of a variable friction gear.

The invention is hereafter described with reference to the accompanying drawings, in which:—

Figure 1 is an end view of the supporting disc and rotatable ring, with the slidable cover removed to show the governor weights.

Figure 2 is a sectional elevation, viewed at right angles to the line 2—2 of Figure 1, illustrating the application of the invention to the axially displaceable driving member of a variable friction gear.

Figure 3 is a detail seen in section along the line 3—3 of Figure 2.

Referring to Figure 1, there is mounted upon the driving shaft $a$ a disc or casing $b$ supporting a rotatable cage in the form of a cylindrical ring $f$. A pair of governor levers $g$ are pivoted at $g^1$ upon the disc $b$, these levers each consisting for example of two similar stamped metal plates provided with toothed segments $g^2$ and pressed upon the shouldered ends of a sleeve $g^3$, fitted upon the pivot $g^1$, the free ends of the plates being connected by a pin or rivet $g^4$ on which is mounted a weight $g^5$. The toothed segments of the governor levers $g$ mesh with part-circular racks $f^3$ on the interior of the cage-ring $f$, so that as the weighted ends of the levers move outwardly the segments $g^2$ produce a relative rotation or advance of the cage-ring over the disc $b$.

As illustrated in Figures 2 and 3, the rotatable cage-ring $f$ is formed with a series of cam-shaped notches $f^2$ upon its outer edge, each of these notches engaging with a roller $e^2$ fitted upon a stud $e^1$ carried by an outer cover $c$ which is held towards the casing $b$ by springs $d$; the end of this cover is formed by a dished or conical plate $c^1$ acting as one member of the friction gear, and the rim of the cover fits around the casing $b$, the roller-provided studs $e^1$ passing through slots $b^2$ in the outer wall of the casing.

The driving connection between the casing $b$ and the cover $c$ is constituted for example by the studs $e^1$ passing through the slots in the casing, or other means such as keys $e$ may be employed for this purpose, these keys being secured by the studs $e^1$ as shown in Figure 3.

The expanding movement of the weighted levers $g$ as the speed of the casing increases, will then cause the rotatable cage-ring $f$ to force the slidable cover $c$ outwards away from the casing, against the restraint of the controlling springs $d$, by the engagement of the cam-shaped notches $f^2$ with the roller-fitted studs.

In addition to the centrifugal effect of the weighted levers dependent upon the speed of rotation, there may be utilized an inertia effect due to the tendency of the lever weights to lag behind or to overtake the disc $b$ as the speed of the latter varies in acceleration or retardation of the driving shaft $a$. This inertia effect will produce a force acting approximately at the center of the weight $g^5$ and at right angles to the line joining its center to the axis of the shaft $a$, this force being resolved into one component passing through the pivot $g^1$ and a second component producing rotation of the governor lever around the pivot $g^1$. In the position shown in Figure 1, the inertia force due to acceleration of the driving shaft will oppose the centrifugal force due to rotation, but obviously it would be possible to arrange for the two forces to act in conjunction under the same conditions, for example by placing the weighted ends of the governor levers upon the opposite sides of the pivots $g^1$.

It will be understood that the invention is not limited to the particular application described; for example the mechanism may be employed for an engine-shaft governor controlling the angle of advance of an eccentric operating the slide valve of a steam engine, or for regulating the advance of the contact breaker of an ignition magneto for an internal combustion engine.

What I claim is:—

1. A governor comprising a rotary casing, an annular member mounted concentrically within said casing and capable of angular movement in relation thereto, a plurality of weighted levers pivoted upon said casing and interiorly of said annular member, each of said levers including a toothed sector, said annular member having internal teeth meshing with the toothed sectors of said levers, the centers of gravity of said levers being so disposed in relation to their respective fulcra that said sectors co-operate in producing angular movement of said annular member as a result of centrifugal force, and resilient means for opposing the angular movement of said annular member.

2. A governor comprising a rotary casing, an annular member mounted concentrically within said casing and capable of angular movement in relation thereto, a plurality of weighted levers pivoted upon said casing and interiorly of said annular member, each of said levers including a toothed sector, said annular member having internal teeth meshing with the toothed sectors of said levers, the centers of gravity of said levers being so disposed in relation to their respective fulcra that said sectors co-operate in producing angular movement of said annular member as a result of centrifugal force, a cover mounted upon the exterior of said casing and capable of axial movement in relation thereto, cam-surfaces formed upon said annular member, means carried by said cover for engaging said cam-surfaces, said cam-engaging means transforming the angular movement of said annular member into axial movement of said cover, and resilient means connecting said cover to said rotary support to oppose the movement of said cover away from said support, said resilient means likewise opposing the angular movement of said annular member and the pivotal movement of said weighted levers until the centrifugal force reaches a predetermined value.

3. A governor comprising a rotary casing, a cover slidably mounted upon said casing, an annular member mounted concentrically within said casing and capable of angular movement in relation thereto, a plurality of weighted levers pivoted upon said casing and interiorly of said annular member, each of said levers including a toothed sector, said annular member having internal teeth meshing with the toothed sectors of said levers, cam-surfaces formed upon one edge of said annular member, internal projections upon said slidable cover, said projections engaging with said cam-surfaces, and springs connecting said slidable cover to said casing.

4. A governor comprising a rotary casing, a cover slidably mounted upon said casing, an annular member mounted concentrically within said casing and capable of angular movement in relation thereto, a plurality of weighted levers pivoted upon said casing and interiorly of said annular member, each of said levers including a toothed sector, said annular member having internal teeth meshing with the toothed sectors of said levers, cam-surfaces formed upon one edge of said annular member, internal projections upon said slidable cover, said projections extending through slots in said casing and engaging with said cam surfaces, said projections and slots serving to guide said cover in its sliding movement over said casing and also to transmit rotary motion from said casing to said slidable cover, and springs connecting said slidable cover to said casing.

5. A governor comprising a rotary casing, a cover slidably mounted upon said casing, an annular member mounted concentrically within said casing and capable of angular movement in relation thereto, a plurality of weighted levers pivoted upon said casing and interiorly of said annular member, each of said levers including a toothed sector, said annular member having internal teeth meshing with the toothed sectors of said levers, cam-surfaces formed upon one edge of said annular member, internal projections upon said slidable cover, said projections extending through slots in said casing and engaging with said cam surfaces, and springs connecting said slidable cover to said casing whereby to oppose the movement of said slidable cover away from said casing, to maintain said projections in engagement with said cam-surfaces, and to retain said annular member in a position with said weighted levers held inwards until the centrifugal force reaches a pre-determined value.

6. A governor comprising a rotary casing, a cover slidably mounted upon said casing, an annular member mounted concentrically within said casing and capable of angular movement in relation thereto, a plurality of weighted levers pivoted upon said casing and interiorly of said annular member, each of said levers including a toothed sector, said annular member having internal teeth meshing with the toothed sectors of said levers, cam-surfaces formed upon one edge of said annular member, internal projections upon said slidable cover, said projections including rollers engaging with said cam surfaces and driving keys engaging with slots in said casing, and resilient means connecting said slidable cover to said casing.

7. A governor comprising a rotary casing, a cover slidably mounted upon the exterior of said casing, said cover having a conical face forming an axially displaceable member, a cylindrical ring mounted in the interior of said casing, one edge of said ring resting rotatably against the bottom of said casing, the other edge of said ring being formed with cam-shaped notches, a plurality of weighted levers pivoted upon the bottom of said casing and within said ring, each of said levers including a toothed sector, said ring having internal teeth meshing with the toothed sectors of said levers, projections upon the interior of said cover, said projections engaging slots in the outer wall of said casing, rollers carried by said projections, said rollers being internal of said outer wall and in position to engage with the cam-shaped notches upon said ring, and springs arranged between the bottom of said casing and the conical face of said cover to hold said cover towards the bottom of said casing.

In testimony whereof I hereunto affix my signature.

JOHN HOGG ROBERTSON.